US006033694A

United States Patent [19]

Boley

[11] Patent Number: 6,033,694
[45] Date of Patent: *Mar. 7, 2000

[54] IODINE SUPPLEMENT FOR ANIMAL FEEDS AND METHOD OF PREPARING SAME

[75] Inventor: Alan E. Boley, Lenexa, Kans.

[73] Assignee: Bolentica, Inc., Lenexa, Kans.

[ * ] Notice: This patent is subject to a terminal disclaimer.

[21] Appl. No.: 09/386,654

[22] Filed: Aug. 31, 1999

Related U.S. Application Data

[63] Continuation of application No. 09/008,748, Jan. 19, 1998.

[51] Int. Cl.$^7$ ..................................................... A23K 1/175
[52] U.S. Cl. ........................... 426/74; 426/807; 426/635; 426/630
[58] Field of Search .............................. 426/74, 630, 635, 426/807

[56] References Cited

U.S. PATENT DOCUMENTS

| | | | |
|---|---|---|---|
| 3,875,304 | 4/1975 | Hunt et al. | 426/31 |
| 3,969,493 | 7/1976 | Fujii et al. | 423/579 |
| 4,199,605 | 4/1980 | Bland | 426/331 |
| 4,858,560 | 8/1989 | Hayashi et al. | 119/1 |

FOREIGN PATENT DOCUMENTS

| | | |
|---|---|---|
| 1117805 | 3/1996 | China . |
| 127109 | 6/1985 | Japan . |

OTHER PUBLICATIONS

Label: "Organic Iodine 20," AgriLabs, St. Joseph, Missouri, Jul. 1991.
McDowell, Lee R.; "Selection, Evaluation of Mineral Supplements a Necessity," *Feedstuffs*, pp. 13–15 and 19. (1992).
Spears, Jerry W. et al.; "Bioavailability of Organic, Inorganic Trace Minerals Explored," *Feedstuffs*, pp. 12–15 (1991).
Preston, R.L.; "Serum Inorganic Iodine Dynamics in Steers Following a Single Oral Dose of Several Iodine Sources," *Texas Tech Univ. Agri. Sciences and Natural Resources Tech Report*, No. T–5–342, pp. 22–24 (1994).

*Primary Examiner*—Chhaya D. Sayala
*Attorney, Agent, or Firm*—Hovey, Williams, Timmons & Collins

[57] ABSTRACT

An iodine supplement for animal feeds and a method of preparing the same which provides a lower cost material with superior blending and stability characteristics. The supplement is achieved by initially reacting elemental iodine with an excess of a metal hydroxide. The reactant product is then reacted with a calcium source which creates a mixture of a solution of an iodide salt and a suspension of a mixture of an insoluble iodate salt and calcium hydroxide. This mixture is then deposited on the surface of a suitable absorbent carrier such as ground corn cobs or soybean meal.

16 Claims, No Drawings

IODINE SUPPLEMENT FOR ANIMAL FEEDS AND METHOD OF PREPARING SAME

RELATED APPLICATIONS

This application is a continuation of U.S. patent application Ser. No. 09/008,748 filed Jan. 19, 1998.

BACKGROUND OF THE INVENTION

Crystalline salts such as ethylenediamine dihydriodide, potassium iodide, and calcium iodate have been added to feedstuffs to provide supplemental iodine to animals. These salts were prepared by well-known chemical methods and have been sold in the form of finely-divided crystalline powders. Sometimes these crystalline iodine salts were diluted with inert chemicals to prevent caking or to provide some degree of separation from other materials when the iodine salt was added to feedstuffs. These products do not have the blending and stability characteristics that are desirable and necessary for superior feedstuffs performance.

Other feed supplements have been prepared by absorbing a concentrated solution of ethylenediamine dihydriodide on an absorptive carrier such as corn gluten feed, wheat bran, or soybean meal. The wet mixture was dried followed by the addition of stabilizers, coloring agents, and diluents. While this supplement's performance in feedstuffs was superior to that of the crystalline iodine salts, it was expensive to manufacture and therefore not commercially acceptable.

Another material used for an iodine feed supplement consisted of a solution of potassium iodide, sodium iodide, or ethylenediamine dihydriodide absorbed on a vegetable carrier with added preservatives, coloring agents, and diluents. While this supplement provided improved performance in feedstuffs over other existing supplements, it also was quite expensive to manufacture.

There is a real and thus unsatisfied need in the art for a stable iodine animal feed supplement and a method of preparing the feed supplement which provides superior performance in feedstuffs and which can be manufactured inexpensively.

SUMMARY OF THE INVENTION

The present invention solves the problems of the prior art as discussed above by providing a supplement which is inexpensive to manufacture while retaining the superior performance necessary to achieve a stable, uniformly blended iodine supplement for animal feed products. According to the present invention, elemental iodine is reacted with an excess of a metal hydroxide, preferably an alkali metal hydroxide. The reactant solution is then reacted with a calcium source, preferably calcium hydroxide or calcium chloride, creating a mixture of a solution of an iodide salt and a suspension of a mixture of an insoluble iodate salt and calcium hydroxide. The resulting product is deposited on the surface of a suitable absorbent carrier, such as ground corn cobs, which can then be added to animal feed.

DETAILED DESCRIPTION OF THE INVENTION

The present invention is directed to preparation of a bio-available mixture of iodine-containing salts deposited on the surface of an absorbent carrier. Crude elemental iodine is reacted with an excess of a metal hydroxide, preferably an alkali metal hydroxide. More preferably, the alkali metal hydroxide is lithium hydroxide, sodium hydroxide, or potassium hydroxide. The reactant solution is reacted with a calcium source, preferably calcium hydroxide or calcium chloride, resulting in a mixture of a solution of an iodide salt and a suspension of a mixture of an insoluble iodate salt and metal hydroxide. Because the iodate salt is insoluble, a stable feed supplement is obtained.

The following illustrates the reaction mechanism by which the invention takes place when sodium hydroxide is the metal hydroxide and calcium hydroxide is the calcium source:

Step 1: $3 I_2 + 6 NaOH \rightarrow NaIO_3 + 5 NaI + 3 H_2O$

Step 2: $2 NaIO_3 + Ca(OH)_2 \rightarrow 2 NaOH + Ca(IO_3)_2$

The resulting mixture from the above reaction is an iodide salt, NaI, and and an insoluble iodate salt, $Ca(IO_3)_2$. The insolubility of the iodate salt reduces the ability of the iodate and iodide ions to react with each other, thus leading to a stable feed additive. Provision of a highly stable iodine supplement product that can be inexpensively manufactured has not been achieved by the prior art. When the reactant mixture is added to an absorbent carrier, the insoluble calcium iodate closely adheres to the surface of the carrier particles.

A variety of iodine-containing salts may be employed to achieve the objects of this invention. These salts include lithium iodide, sodium iodide, potassium iodide, calcium iodide, lithium iodate sodium iodate, potassium iodate, and calcium iodate.

In Step 1 of the reaction, a sufficient amount of metal hydroxide is preferably provided in order to maintain the pH of the reaction mixture above about 8.5. More preferably, the quantity of metal hydroxide is adequate to maintain the pH from about 10 to about 12. The amount of excess metal hydroxide supplied will vary depending on whether calcium chloride or calcium hydroxide is the calcium source. Maintaining the pH of the reaction mixture within the range specified has been found to increase the stability of the product by preventing the iodate and iodide ions from reacting to form iodine as would be the case if the reaction took place in an acidic media.

When adding the iodide-insoluble iodate mixture to the carrier, the mixture should be applied in a ratio of about one part of the reaction mixture to about three parts to about twenty parts of carrier. More preferably, the ratio should be about two parts of iodide-insoluble iodate mixture to about ten parts of the carrier. It will be appreciated that this ratio can be varied dependent upon the absorptive ability and the surface characteristics of the particular carrier utilized.

Numerous other materials may be added to the iodine supplement product as needed. For example, one skilled in the art may wish to dilute the product by adding other ingredients or to cause the carrier to absorb additional moisture. Furthermore, mold growth can be prevented or reduced by adding a mold inhibitor such as propionic acid or a mixture of propionic acid and acetic acid. Finally, dyes may be added to obtain a feed product of suitable color.

A wide variety of absorbent carrier may be utilized with the stable iodine-containing composition of this invention. Preferred carriers are ones that are highly absorptive and have surface characteristics which facilitate the adherence of small particles to the carrier particles. Suitable carriers include corn meal, wheat shorts, corn gluten meal, dehydrated molasses, linseed meal, cottonseed meal, canola meal, safflower meal, and peanut hulls. More preferably, the carrier is beet pulp, rolled oat groats, soybean meal, dried apple pomace, or dried citrus pulp. The most preferable carriers are selected from the group consisting of wheat bran, dried kelp, ground corn cobs, and hydrated sodium calcium aluminosilicate.

The particle size of the carrier should be controlled in order to provide a sufficient number of particles as well as to provide a material of satisfactory bulk density which will enable the product to mix well with common feedstuffs. If a vegetable carrier is employed, the particle size of the carrier preferably ranges from about 14 mesh (standard sieve size) to about 200 mesh. More preferably, the particle size of the vegetable carrier should be from about 20 mesh to about 100 mesh and most preferably from about 40 mesh to about 60 mesh. If a mineral carrier is used, the particle size of the carrier may range from about 30 mesh to about 325 mesh and preferably from about 80 mesh to about 150 mesh.

If calcium hydroxide is employed as the calcium source (as exemplified in step 2 of the above reaction), the particle size of the calcium hydroxide should be such that at least about 90% of the calcium material will pass through a 325 mesh screen in order to provide sufficient surface area to drive the reaction. This particle size assures that a maximum amount of unreacted calcium hydroxide will be retained on the surface of the chosen carrier.

EXAMPLE 1

According to the present invention, 18 grams of potassium hydroxide was dissolved in 40 grams of water. To this solution, 39 grams of crude iodine was added, and the resulting mixture was stirred until all of the iodine was dissolved. Next, 2 grams of potassium hydroxide was added to complete the conversion of iodine to iodide and iodate. Five grams of calcium hydroxide was added and the suspension was allowed to digest at a temperature of slightly under 100° C. for one hour. After cooling, the suspension was slowly poured, with agitation, onto 380 grams of ground corn cobs. Two 5 milliliter rinses of water were used to remove all of the solids from the beaker for delivery to the ground corn cobs. Mixing of the carrier was continued until a uniform appearance was achieved.

EXAMPLE 2

Forty grams of water, 20 grams of potassium hydroxide, 5 grams of calcium hydroxide, and 38 grams of iodine were mixed and stirred. The mixture was heated to drive the reaction to completion. After cooling, the suspension was added to 300 grams of ground corn cobs under agitation. A solution of 1.2 grams of potassium hydroxide in 20 grams of water was used to rinse all of the solids from the beaker onto the carrier. Eighty grams of finely divided calcium carbonate was added to the batch. Mixing continued until a uniform mixture was achieved.

EXAMPLE 3

Forty grams of water, 25 grams of potassium hydroxide, 5 grams of calcium hydroxide and 38 grams of iodine were placed in an insulated beaker and stirred for one hour. The resulting solution was added to 300 grams of corn cobs.

I claim:

1. A stable, iodine-containing additive for feedstuffs comprising:
    an absorbent carrier having a relatively large surface area; and
    an iodine-containing composition comprising an iodide and an insoluble iodate, said iodate being deposited on the surface of said carrier and said iodide being absorbed into said carrier.

2. The additive of claim 1, wherein the iodide of the iodine-containing composition is a metal iodide.

3. The additive of claim 2, wherein the metal iodide is selected from the group consisting of lithium iodide, sodium iodide, potassium iodide, and calcium iodide.

4. The additive of claim 1, wherein the iodate of the iodine-containing composition is a metal iodate.

5. The additive of claim 4, wherein the metal iodate is selected from the group consisting of lithium iodate, sodium iodate, potassium iodate, and calcium iodate.

6. The additive of claim 1, wherein the absorbent carrier is selected from the group consisting of corn meal, wheat shorts, corn gluten meal, dehydrated molasses, linseed meal, cottonseed meal, canola meal, safflower meal, and peanut hulls.

7. The additive of claim 1, wherein the absorbent carrier is selected from the group consisting of beet pulp, rolled oat groats, soybean meal, dried apple pomace, and dried citrus pulp.

8. The additive of claim 1, wherein the absorbent carrier is selected from the group consisting of wheat bran, dried kelp, ground corn cobs, and hydrated sodium calcium aluminosilicate.

9. The additive of claim 1, wherein the carrier is a vegetable carrier having a particle size of from about 14 mesh to about 200 mesh.

10. The additive of claim 1, wherein the carrier is a vegetable carrier having a particle size of from about 20 mesh to about 100 mesh.

11. The additive of claim 1, wherein the carrier is a vegetable carrier having a particle size of from about 40 mesh to about 60 mesh.

12. The additive of claim 1, wherein the carrier is a mineral carrier having a particle size of from about 30 mesh to about 325 mesh.

13. The additive of claim 1, wherein the carrier is a mineral carrier having a particle size of from about 80 mesh to about 150 mesh.

14. The additive of claim 1, further including a mold inhibitor.

15. The additive of claim 14, wherein the mold inhibitor is propionic acid.

16. The additive of claim 14, wherein the mold inhibitor is a mixture of propionic acid and acetic acid.

* * * * *